United States Patent [19]

Berecz et al.

[11] Patent Number: 4,846,674
[45] Date of Patent: Jul. 11, 1989

[54] METHOD AND APPARATUS FOR HEATING REMOVABLY ATTACHABLE HEADING TOOL DIES

[75] Inventors: Imre Berecz, Rancho Santa Margarita; Dennis Schultz, Fullerton, both of Calif.

[73] Assignee: Microdot Inc., Darien, Conn.

[21] Appl. No.: 154,281

[22] Filed: Feb. 10, 1988

[51] Int. Cl.⁴ .................................................. F27B 9/12
[52] U.S. Cl. ........................................ 432/18; 432/25
[58] Field of Search .................. 34/4, 17, 39; 432/18, 432/24

[56] References Cited

U.S. PATENT DOCUMENTS 4,255,133  3/1981  Tanhuti et al. ...................... 432/24
4,678,432  7/1987  Teraoka ............................. 432/24 X Primary Examiner—Henry A. Bennett
Attorney, Agent, or Firm—Lyman R. Lyon

[57] ABSTRACT

An apparatus for precisely heating a continuous stream of heading tool dies to a desired temperature for immediate use thereafter in a rivet heading operation comprises a closed-loop transport system having a variable-speed drive and receptacle means for receiving and retaining heading tool dies for transportation therewith, with a first section of the die transport system being exposed to fluid medium having reference temperature below the desired die temperature, and a second fixed-length section of the die transport system being exposed to a constant temperature heat source. The temperature of the dies is thus normalized by exposure to the reference temperature fluid medium, whereafter a metered quantity of heat is transferred to each die by the controlled exposure thereof to the constant temperature heat source as determined by adjustment of die transport speed, whereby the dies are precisely heated to the desired temperature. A preferred embodiment of the instant invention additionally facilitates installation of the thus heated dies on a heading tool which is adapted to receive such dies.

18 Claims, 2 Drawing Sheets

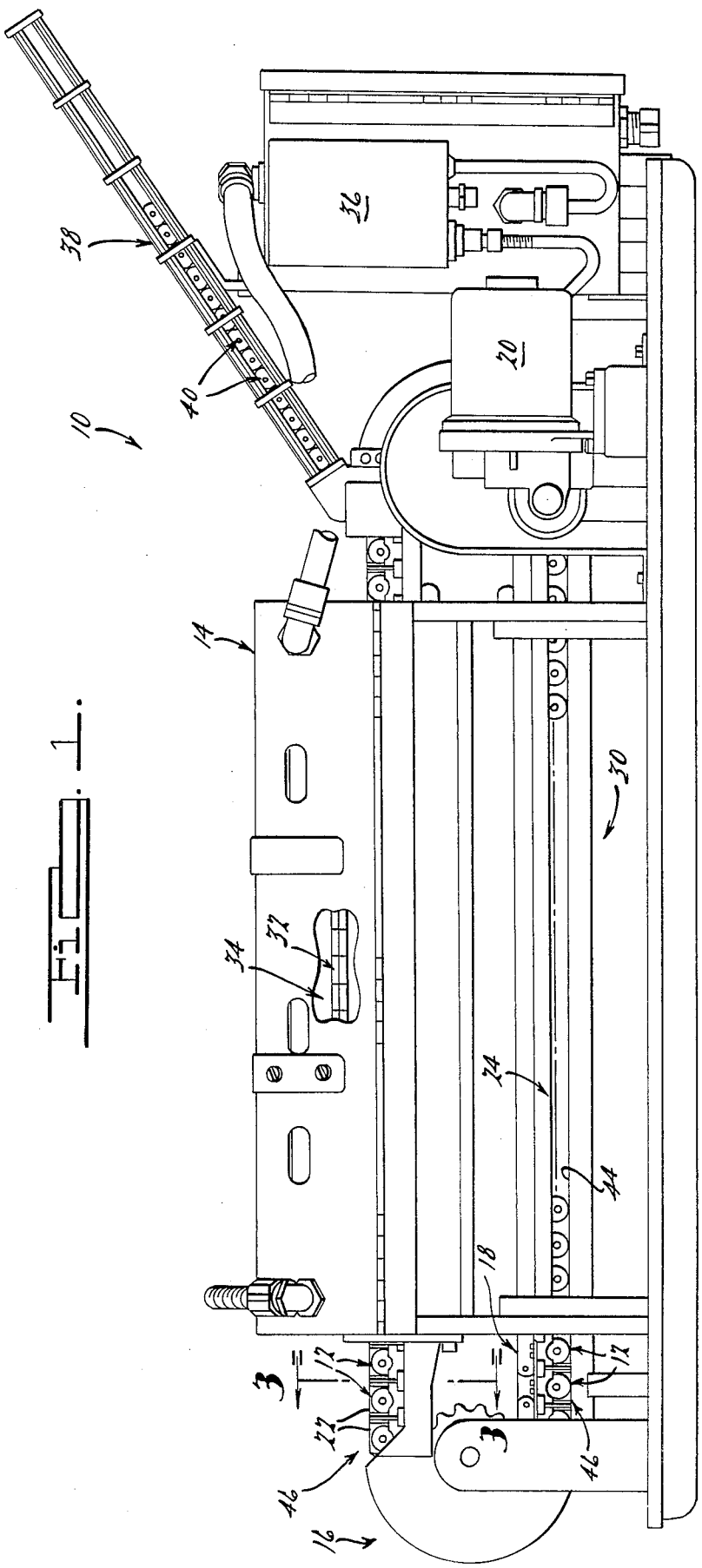

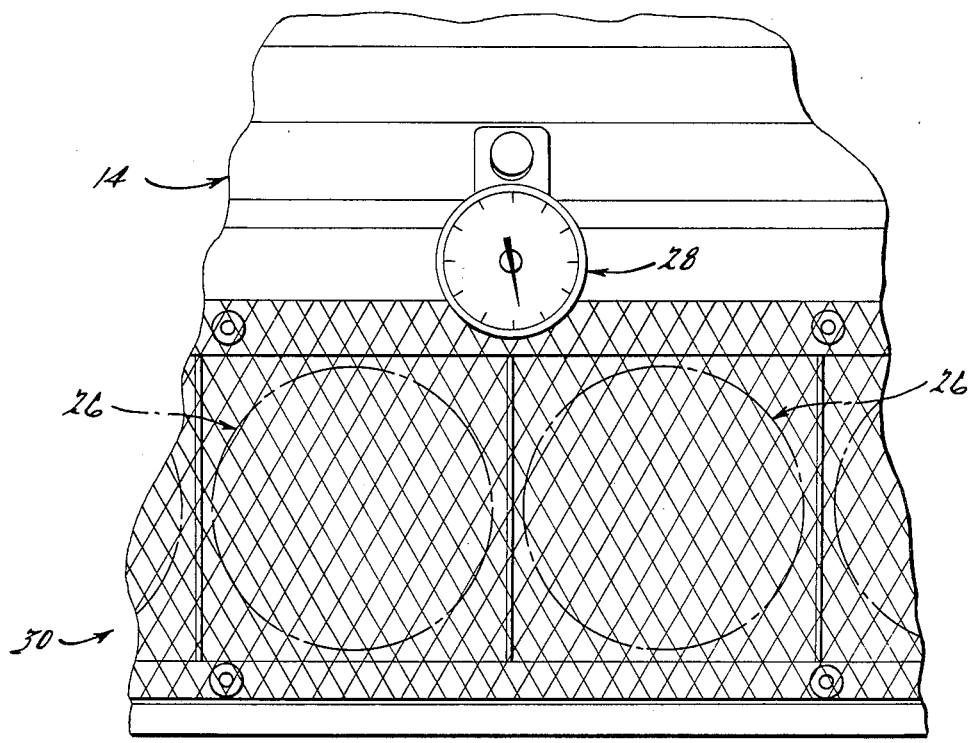
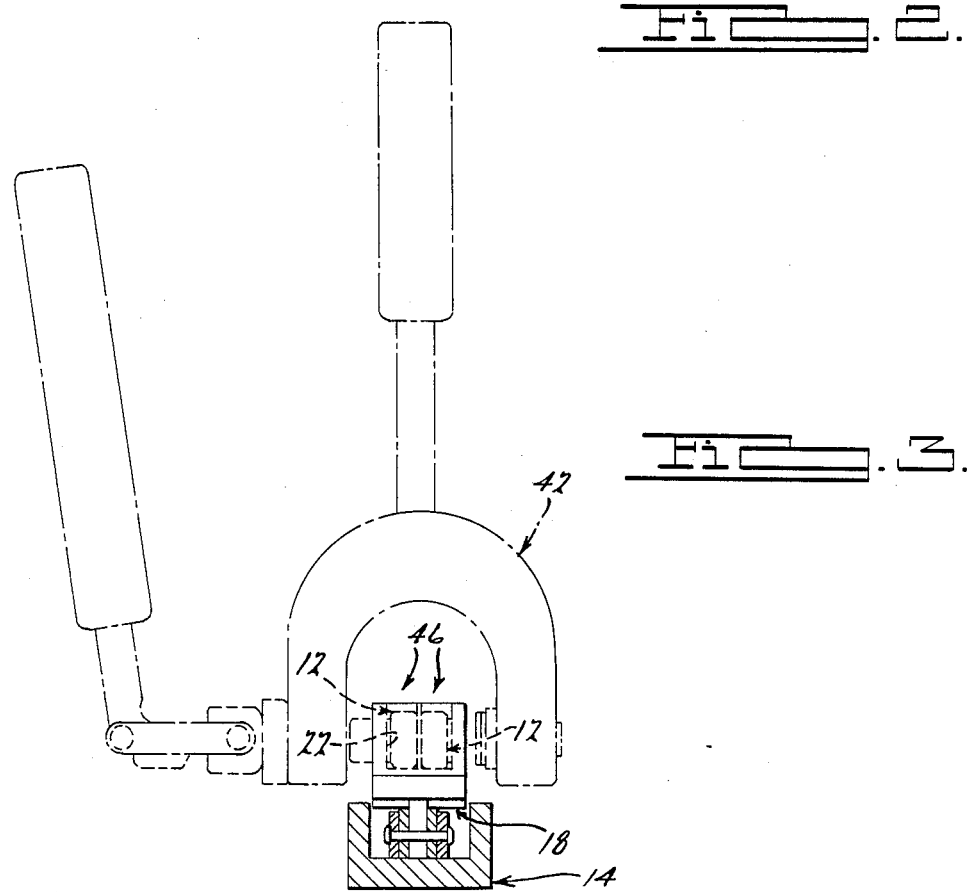

METHOD AND APPARATUS FOR HEATING REMOVABLY ATTACHABLE HEADING TOOL DIES

BACKGROUND OF THE INVENTION

The instant invention relates to methods and apparatus for heating removably attachable rivet headforming dies used by various heading tools which in turn impart curing heat to a plastic rivet during the formation of a head thereon.

The prior art teaches the setting, or more accurately, the softening, head forming and complete polymerization, of a thermoset plastic rivet such as the "Composite Rivet" disclosed in U. S. Pat. No. 4,478,544, issued Oct. 23, 1984, and assigned to the assignee of the instant invention, by applying heat to initially soften, and later to fully polymerize, the "B"-staged head-forming portion of the rivet during the formation of a head thereon by a heading tool comprising a die. However, due to the difficulty involved with the precise application of heat to the head-forming portion of a rivet at the proper instant prior to and during the head forming operation, the prior art has resorted to the use of plastics which remain "B"-staged only at relatively low temperatures. The removal of such a rivet from the low temperature environment at which it is stored to ambient temperature conditions imparts sufficient heat thereto to initially soften, and eventually cause complete polymerization of, the rivet.

It will be appreciated that the controlled delivery of heat to the rivet permits the use of a wider range of matrix materials while facilitating acceleration of the entire "setting" process. In my copending application entitled "Tool for Setting Plastic Rivets," Ser. No. 07/031,654, filed Mar. 30, 1987 now U.S. Pat. No. 4,736,507, and assigned to the assignee of the instant invention, I teach a heading tool featuring removably attachable rivet head-forming dies which may be heated immediately prior to the riveting operation. The heat thus imparted to the removable head-forming dies is thereafter transferred directly to the rivet during head formation thereon, thereby facilitating the softening of the plastic rivet prior to and during head forming, and effecting controlled polymerization of the rivet by virtue of its readily ascertainable heat transfer characteristics. The precise control of die temperature, however, becomes critical to achieving such superior rivet head formation.

SUMMARY OF THE INVENTION

The purpose of the instant invention is to provide a method and apparatus for heating removably attachable heading tool dies in a manner so as to continuously provide such dies at a precisely controlled, and yet readily adjustable, temperature.

It is also the purpose of the instant invention to provide an apparatus which facilitates installation of such precisely heated dies on a heading tool adapted to receive such dies, thereby providing immediate availability of the dies for use in a heading operation.

The method of the instant invention for precisely heating heading tool dies to a desired temperature comprises the steps of normalizing the temperature of the dies at a reference temperature below the desired die temperature, and transferring a metered quantity of heat to the dies so as to bring the dies the desired die temperature, at which time the dies are ready for use in a rivet head-forming operation.

More specifically, the normalization of die temperature is accomplished by heat exchanging the dies with a fluid medium maintained substantially at the reference temperature. The subsequent transfer of a metered quantity of heat to the dies is accomplished by exposing the dies to a constant temperature heat source operating at a temperature greater than the desired die temperature, as by transporting the dies on a die transfer system having a section thereof proximate with the heat source, whereby the period of exposure of the dies to the heat source and, hence, the quantity of heat transferred to the dies are adjusted through adjustment of the speed of the die transport system. Thus, die temperature is precisely controlled, and yet remains readily adjustable, under the method of the instant invention.

The apparatus of the instant invention for heating removably attachable heading tool dies to a desired temperature generally comprises means for normalizing the temperature of the dies at a temperature below the desired die temperature, and means for transferring a metered quantity of heat to the dies, whereby the dies are precisely heated to the desired temperature.

More specifically, the heading tool die heating apparatus of the instant invention comprises a transport system having receptacle means for receiving and retaining removably attachable heading tool dies fed thereinto; a fluid medium having a reference temperature below the desired die temperature to which a first section of the die transport system is exposed, whereby the temperature of the dies is normalized at a temperature substantially equal to the reference temperature of the fluid medium; a constant temperature heat source operating at a temperature greater than the desired die temperature to which a second fixed-length section of the die transport system is exposed, with the heat source operating at a temperature greater than the desired die temperature; and speed control means for the die transport system, whereby the desired die temperature is obtained by adjusting the period of time that the dies travel through the second section of the die transport system, i.e., the period of time that the dies are exposed to the heat source. The utilization of a closed-loop transport system in combination with a bin-feeder provides a continuous supply of precisely heated heading tool dies for immediate use with a heading tool of suitable configuration.

BRIEF DESCRIPTION OF THE DRAWINGS

FIG. 1 is a front view in elevation of an exemplary embodiment of the heading tool die heating apparatus of the instant invention;

FIG. 2 is an enlarged partial view of the back side of the apparatus shown in FIG. 1 illustrating the die temperature normalizing means thereof; and FIG. 3 is a partial view in cross-section of the heating apparatus along line 3—3 of FIG. 1 illustrating installation of the dies heated thereby on a rivet heading tool adapted to receive such dies.

DETAILED DESCRIPTION OF THE PREFERRED EMBODIMENT OF THE INVENTION

Referring to the FIGS. 1 and 2, an exemplary embodiment 10 of the heading tool die heating apparatus of the instant invention for heating a die 12 to a desired temperature which is greater than the ambient temperature comprises an enclosure 14 encompassing a die transport system 16 comprising an endless, adjustable-speed conveyor 18 driven by a variable-speed motor 20 and having a plurality of open-ended receptacles, or nests 22, thereon for receiving and retaining the dies 12 for transportation therewith; die temperature normalizing means along a first section 24 of the conveyor 18 comprising a plurality of exhaust fans 26 operating under the control of a thermostat 28 so as to ventilate a portion 30 of the enclosure 14, whereby the first section 24 of the conveyor 18 is immersed in a sufficient quantity of ambient air to bring each die 12 passing therethrough to a temperature substantially equal to the ambient temperature; means for transferring a metered quantity of heat to the dies 12 comprising a constant temperature heat source, such as a quartz lamp 32, operating at a temperature above the desired die temperature and positioned proximate with the conveyor 18 so as to expose a second fixed-length section 34 thereof to the heat source 32; and speed control means 36 for the conveyor 18, whereby the period of time that each die 12 travels along the second section 34 of the conveyor 18, i.e., the time that each die 12 is exposed to the quartz lamp 32, is prescribed.

A bin feeder 38 supplies additional dies 40 to the nests 22 made vacant by the removal therefrom of dies 12 for use in a heading tool 42 of suitable configuration, such as is shown in FIG. 3. Since the dies 40 within the bin feeder 38 are maintained at ambient temperature, i.e., at the reference temperature of the fluid medium utilized to normalize the temperature of the dies 12 already situated in nests 22 of conveyor 18, the additional dies 40 are fed into the vacant nests 22 at a point on the conveyor 18 between the first and second sections 24 and 34 thereof. It will be appreciated that, where the dies 40 within the die feeder are not maintained at the die reference temperature, the dies 40 are fed into vacant nests 22 at a point on the conveyor 18 prior to the first section 24 thereof along which normalization of die temperature occurs. The floor 44 of the enclosure 14 serves to block the open ends 46 of the nests 22 travelling along the first section 24 of the conveyor 18, whereby the dies 12 are maintained in the nests 22 while being bathed in ambient air.

In operation, the temperature of the die 12 within each nest 22 of the conveyor 18 is normalized to a reference temperature by head exchanging the die 12 with ambient air during its passage through the ventilated portion 30 of the enclosure 14. It will be appreciated that the instant invention contemplates the use of other fluid media at other reference temperatures, such as ice water or other similar twophase solutions, particularly where the greater reference temperature tolerances achievable with such other fluid media are required, or where the desired temperature is substantially equal to, or below, ambient air temperature.

Subsequent to die temperature normalization, each die is controllably exposed to the quartz lamp 32 during its travel along the second section 34 of the conveyor 18. The dies 12 thus receive a metered quantity of heat from the lamp 32 as determined by the rate of heat transfer therefrom times the period of exposure, i.e., the length of the exposed section 34 of the conveyor 18 divided by the speed thereof. The dies 12 are thus precisely heated to the desired die temperature just as the dies 12 exit the second section 34 of the conveyor 18. The dies 12 are then ready for immediate use in heading tool 42. It will be noted that the enclosure 14 is suitably configured to permit immediate access to the thus heated dies 12. Preferably, the dies 12 may be directly installed on the heading tool 24 in order to minimize delay and, hence, die temperature change prior to the use thereof in a rivet heading operation.

The dies 12 that are not immediately used in a rivet heading operation, i.e., the dies 12 that remain within nests 22, are directed by the closed-loop conveyor 18 back along the first section 24 thereof through the ventilated portion 30 of the enclosure 14, whereby the temperature of the dies 12 is once again normalized to the reference temperature. The temperature of the dies 12 is thus cyclically normalized and precisely heated until such time as the dies 12 are needed.

It is noted that, while the normalization of die temperature along the first section 24 of the die transport system 16 typically involves the cooling thereof, particularly where a closed-loop transport system cyclically cools and heats the dies until the dies are removed therefrom for immediate use in a rivet heading operation, the instant invention contemplates the heating of the dies 12 during such normalization procedure whenever the temperature thereof is below the normalized, or reference, die temperature.

While the preferred embodiment of the invention has been disclosed, it should be appreciated that the invention is susceptible of modification without departing from the spirit of the invention or the scope of the subjoined claims.

I claim:

1. A method for heating removably attachable heading tool dies to a desired temperature comprising the steps of
    normalizing said dies at a reference temperature, said reference temperature being below said desired temperature; and
    transferring a metered quantity of heat to said dies from a constant temperature heat source operating above said desired temperature, whereby said dies are heated to said desired temperature.

2. The method according to claim 1 wherein said quantity of heat transferred to said dies from said heat source is metered by prescribing the period of exposure of said dies thereto.

3. The method according to claim 2 wherein normalizing said dies at a reference temperature comprises immersing said dies in a fluid medium maintained substantially at said reference temperature.

4. A method for heating removably attachable heading tool dies to a desired temperature comprising the steps of
    heat exchanging said dies with a fluid medium maintained at a reference temperature below said desired temperature, whereby the temperature of said dies is normalized at a temperature substantially equal to said reference temperature; and
    heating said dies by exposing said dies to a constant temperature heat source for a period of time sufficient to heat said dies to said desired temperature, said heat source operating at a temperature greater than said desired temperature.

5. The method according to claim 4 wherein said fluid medium is air at ambient temperature.

6. The method according to claim 4 wherein said constant temperature heat source comprises a quartz lamp.

7. The method according to claim 6 wherein said dies are exposed to said lamp by passing said dies under said lamp on a variable-speed transport system having a section thereof proximate with said lamp and exposed thereto, whereby the period of exposure of each of said dies to said lamp is determined by the length of said exposed section of said transport system divided by the speed of said transport system.

8. The method according to claim 7 wherein said variable-speed transport system comprises a closed loop, whereby each of said dies is cyclically normalized at said reference temperature and then heated, until the use thereof with a heading tool.

9. An apparatus for heating removably attachable heading tool dies to a desired temperature comprising
   means for normalizing the temperature of said dies at a reference temperature, said reference temperature being below said desired die temperature; and
   means for transferring a metered quantity of heat to said normalized temperature dies, whereby said dies are heated to said desired temperature.

10. The apparatus of claim 9 wherein said means for normalizing the temperature of said dies comprises means for heat exchanging said dies with a fluid medium maintained at a temperature substantially equal to said reference temperature.

11. The apparatus of claim 10 wherein said means for transferring a metered quantity of heat to said dies comprises
   a constant temperature heat source operating at a temperature greater than said desired die temperature; and
   means for controllably exposing sid dies to said heat source.

12. The apparatus of claim 11 wherein said means for heat exchanging said dies with said fluid medium and said means for controllably exposing said dies to said heat source comprises
   an adjustable-speed die transport system having receptacle means thereon for receiving and retaining said dies for transportation therewith,
   a first section of said die transport system being exposed to said fluid medium, and
   a second fixed-length section of said die transport system being exposed to said heat source, whereby said dies are controllably exposed to said heat source by adjusting the speed of said die transport system.

13. An apparatus for heating removably attachable heading tool dies to a desired temperature comprising
   a closed-loop transport system having receptacle means thereon for receiving and retaining said dies for transportation therewith;
   a fluid medium having a reference temperature below said desired temperature, said fluid medium heat exchanging with said dies along a first section of said die transport system, whereby said dies are normalized at a temperature substantially equal to said reference temperature; a constant temperature heat source in proximity with a second fixed-length section of said die transport system and operating at a temperature greater than said desired temperature, said heat source transferring heat to said dies for the period of time that said dies are exposed thereto, whereby said dies are heated to said desired temperature; and
   speed control means for said die transport system to adjust the period of time that said dies are exposed to said heat source.

14. The apparatus according to claim 13 wherein said die transport system comprises an endless conveyor driven by a variable-speed motor.

15. The apparatus according to claim 14 wherein said receptable means of said die transport system comprises a plurality of open-ended nests adapted to receive said dies, said nests permitting heat transfer between said fluid medium and said dies, and from said heat source to said dies.

16. The apparatus according to claim 15 including die-feeding means for providing additional dies at said reference temperature to said die transport system at a point thereon between the first and second sections thereof.

17. The apparatus according to claim 16 wherein said die-feeding means comprises a bin feeder.

18. The apparatus according to claim 13 wherein said heat source comprises a quartz lamp.

* * * * *